(No Model.)

E. E. THRESHER.
MUSICAL CHART.

No. 253,562. Patented Feb. 14, 1882.

Witnesses:
A. Scott
Jas. W. Graham

Inventor
E. E. Thresher
By P. A. Kerr
Atty

UNITED STATES PATENT OFFICE.

EDWARD E. THRESHER, OF REED CITY, MICHIGAN.

MUSICAL CHART.

SPECIFICATION forming part of Letters Patent No. 253,562, dated February 14, 1882.

Application filed April 23, 1881. (No model.)

*To all whom it may concern:*

Be it known that I, EDWARD E. THRESHER, a citizen of the United States, residing at Reed City, in the county of Osceola and State of Michigan, have invented certain new and useful Improvements in Musical Charts; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of my invention is to furnish a convenient chart with adjustable notes and characters to be used in teaching and writing music, and to enable the instructor to change the notes and characters on the staff, so as to present in a perfect manner any changes desired without erasing and rewriting such exercises on a blackboard, as heretofore practiced. I attain these objects by the mechanism illustrated in the accompanying drawings, in which—

Figure 1:
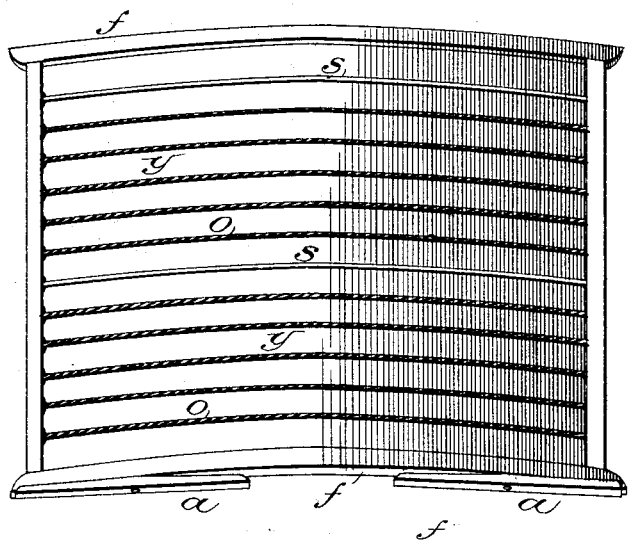

Figure 1 is a curved white surface, being convex from right to left, and over which from right to left are tightly drawn cords of dark color corresponding with the lines in the staff upon which music is written, the curvature being for the purpose of holding the lines or cords tightly to the surface of the chart, in order to hold in place the notes and characters to be placed between the cords and the surface of the chart.

Similar letters refer to similar parts throughout the figures.

*f f* represent top and bottom of curved frame.

*y y* are white surface of the chart, conforming to curvature of the frame. *o o* are cords of dark color. S S are a cord of red color, to represent added line on staff. *a a* are rests, to be turned at right angles with the frame when chart is to stand on the table, and to close under the frame while the chart is hanging on the wall.

Figure 2:
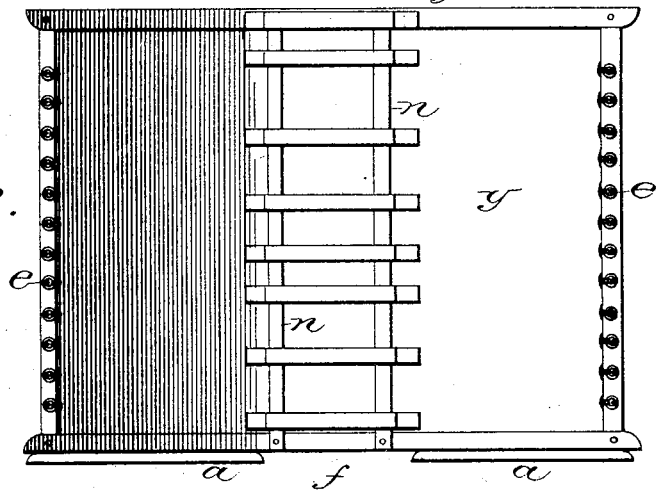

Fig. 2 is a back view of the chart. E E represent hooks or nails to which the cords are attached. *n n* represent standards and adjustable bars to show steps and half-steps in the scale.

Figure 3:

Fig. 3 is a front view of the chart with notes and characters placed in position. S S are red cord to represent added line, detached from hook at one end. All cords may be thus detached as desired.

Notes and other characters used in music are printed on thick card-board or other suitable material, each note or character being on separate slip and placed on staff in any desirable position and held in place by the cords.

What I claim, and desire to secure by Letters Patent, is—

1. A music-chart having a curved surface, and provided with cords of a different color drawn across it and arranged to represent the lines of a musical staff, substantially as set forth.

2. The combination of a music-chart having a curved surface, and provided with adjustable cords drawn across it and arranged to represent the lines of a musical staff, holding in position adjustable notes and characters used in teaching and writing music.

In testimony whereof I affix my signature in presence of two witnesses.

EDWARD E. THRESHER.

Witnesses:
J. K. FEICK,
J. Q. PATTERSON.